US007769823B2

(12) United States Patent
Jenny et al.

(10) Patent No.: US 7,769,823 B2
(45) Date of Patent: Aug. 3, 2010

(54) METHOD AND SYSTEM FOR DISTRIBUTING REQUESTS FOR CONTENT

(75) Inventors: Patrick Duncan Jenny, Issaquah, WA (US); Carlton G. Amdahl, Fremont, CA (US); Scott P. Tennican, Hamburg (DE)

(73) Assignee: F5 Networks, Inc., Seattle, WA (US)

( * ) Notice: Subject to any disclaimer, the term of this patent is extended or adjusted under 35 U.S.C. 154(b) by 1032 days.

(21) Appl. No.: 09/966,819

(22) Filed: Sep. 28, 2001

(65) Prior Publication Data

US 2003/0065743 A1   Apr. 3, 2003

(51) Int. Cl.
*G06F 15/16* (2006.01)
*G06F 15/173* (2006.01)

(52) U.S. Cl. .................................. 709/219; 709/224

(58) Field of Classification Search ................. 709/219, 709/223, 224; 711/119
See application file for complete search history.

(56) References Cited

U.S. PATENT DOCUMENTS

| 5,566,349 | A | * | 10/1996 | Trout ............................ 710/20 |
| 5,590,301 | A | * | 12/1996 | Guenthner et al. ........... 711/202 |
| 5,611,049 | A | * | 3/1997 | Pitts ............................... 707/8 |
| 5,713,003 | A | * | 1/1998 | DeWitt et al. ................ 711/118 |
| 5,740,370 | A | * | 4/1998 | Battersby et al. ............. 709/219 |
| 5,838,910 | A | * | 11/1998 | Domenikos et al. .......... 709/203 |
| 5,892,914 | A | * | 4/1999 | Pitts ............................. 709/219 |
| 5,933,849 | A | * | 8/1999 | Srbljic et al. ................. 711/118 |
| 5,935,207 | A | * | 8/1999 | Logue et al. ................. 709/219 |
| 6,016,512 | A | * | 1/2000 | Huitema ...................... 709/245 |
| 6,085,234 | A | * | 7/2000 | Pitts et al. ................... 709/217 |
| 6,094,706 | A | * | 7/2000 | Factor et al. ................. 711/113 |
| 6,167,438 | A | * | 12/2000 | Yates et al. .................. 709/216 |
| 6,185,601 | B1 | * | 2/2001 | Wolff ........................... 709/203 |
| 6,205,481 | B1 | * | 3/2001 | Heddaya et al. ............. 709/226 |
| 6,212,565 | B1 | * | 4/2001 | Gupta .......................... 709/229 |
| 6,216,215 | B1 | * | 4/2001 | Palanca et al. ................ 712/23 |
| 6,233,606 | B1 | * | 5/2001 | Dujari .......................... 709/213 |
| 6,249,844 | B1 | * | 6/2001 | Schloss et al. ............... 711/122 |
| 6,330,572 | B1 | * | 12/2001 | Sitka ............................ 707/205 |
| 6,330,606 | B1 | * | 12/2001 | Logue et al. ................. 709/226 |
| 6,370,620 | B1 | * | 4/2002 | Wu et al. ...................... 711/132 |
| 6,374,241 | B1 | * | 4/2002 | Lamburt et al. ................ 707/6 |
| 6,415,359 | B1 | * | 7/2002 | Kimura et al. ............... 711/137 |
| 6,425,005 | B1 | * | 7/2002 | Dugan et al. ................. 709/223 |

(Continued)

FOREIGN PATENT DOCUMENTS

JP      402239319 A   *   9/1990

*Primary Examiner*—Larry Donaghue
(74) *Attorney, Agent, or Firm*—Frommer Lawrence & Haug LLP; Scott M. Tobias

(57) ABSTRACT

A method and system for caching content, such as content requested from a server on the World Wide Web. Requests for dynamic content are forwarded directly to a content server to avoid caching data that might only be used once. Requests for static content are forwarded to a hot or a regular cache depending on the frequency at which the content is requested. When a hot cache does not contain the content, it forwards the request to the forwarder which then forwards the request to a regular cache. When the regular cache does not contain the content, it requests the content from the forwarder which then forwards the request to a content server. There may be more than two layers of cache.

27 Claims, 10 Drawing Sheets

U.S. PATENT DOCUMENTS

| | | | | |
|---|---|---|---|---|
| 6,438,652 B1* | 8/2002 | Jordan et al. | | 711/120 |
| 6,505,241 B2* | 1/2003 | Pitts | | 709/218 |
| 6,542,964 B1* | 4/2003 | Scharber | | 711/122 |
| 6,591,341 B1* | 7/2003 | Sharma | | 711/122 |
| 6,598,077 B2* | 7/2003 | Primak et al. | | 709/219 |
| 6,681,387 B1* | 1/2004 | Hwu et al. | | 717/158 |
| 6,741,963 B1* | 5/2004 | Badt et al. | | 704/270 |
| 6,785,704 B1* | 8/2004 | McCanne | | 718/105 |
| 6,990,534 B2* | 1/2006 | Mikhailov et al. | | 709/250 |
| 7,035,907 B1* | 4/2006 | Decasper et al. | | 709/212 |
| 7,047,242 B1* | 5/2006 | Ponte | | 707/10 |
| 7,047,281 B1* | 5/2006 | Kausik | | 709/213 |
| 7,061,923 B2* | 6/2006 | Dugan et al. | | 370/396 |
| 7,072,982 B2* | 7/2006 | Teodosiu et al. | | 709/245 |
| 7,096,266 B2* | 8/2006 | Lewin et al. | | 709/226 |
| 7,146,429 B2* | 12/2006 | Michel | | 709/238 |
| 7,188,216 B1* | 3/2007 | Rajkumar et al. | | 711/118 |
| 2001/0011349 A1* | 8/2001 | Garrison | | 713/165 |
| 2001/0042171 A1* | 11/2001 | Vermeulen | | 711/118 |
| 2001/0049818 A1* | 12/2001 | Banerjia et al. | | 717/9 |
| 2002/0026560 A1* | 2/2002 | Jordan et al. | | 711/120 |
| 2002/0103972 A1* | 8/2002 | Satran et al. | | 711/119 |
| 2006/0004957 A1* | 1/2006 | Hand et al. | | 711/113 |

* cited by examiner

FIG. 6

| Content | Hits | Hot |
|---|---|---|
| www.company1.com/home | 5 | 0 |
| www.company1.com/help | 2 | 0 |
| www.company1.com/support | 3 | 0 |
| www.company1.com/products | 7 | 0 |
| www.company1.com/contact | 1 | 0 |
| www.company1.com/news | 15 | 1 |
| www.company2.com/home | 20 | 1 |
| www.company2.com/help | 3 | 0 |
| www.company2.com/support | 2 | 0 |
| www.company2.com/products | 5 | 0 |
| www.company2.com/contact | 3 | 0 |
| www.company2.com/news | 7 | 0 |

METHOD AND SYSTEM FOR DISTRIBUTING REQUESTS FOR CONTENT

FIELD OF THE INVENTION

The present invention relates to information caching, and in particular to caching content from servers distributed over a wide area network.

BACKGROUND

The World Wide Web (WWW) provides access to a vast amount of information. At times, some information is accessed much more frequently than other information. At other times, information that was frequently accessed previously becomes less frequently accessed. For example, when a hot news story is first published on the WWW, many users may request the Web page featuring the story. As the story becomes older and other stories are published, the Web page may be requested less frequently. Eventually, the Web page may be requested seldom if at all.

Similarly, a company may announce a new product and post information on its Web site about the product. Initially, many users may request Web pages regarding the product. These requests may follow a certain pattern each day. For example, during morning working hours, requests for Web pages regarding the product may spike. Later in the day, requests for the Web pages may decrease. At night, relatively few requests for the pages may be received.

A company may place information on a Web page for a variety of reasons. For example, it may place information on Web pages to attract potential customers, inform employees, or establish a presence on the Web. When a user is required to wait too long for a Web page to be served, however, the user often loses interest and decides to visit other Web sites or pages. Responding too slowly to Web page requests may be harmful for sales, decrease worker productivity, or give a company a bad image.

SUMMARY

In accordance with the present invention, there is provided a method and system for caching content, such as content requested from a server on the WWW. Requests for content that may change for each user (also known as dynamic content) are forwarded to a content server to avoid caching data that might only be used once. Requests for static content are forwarded to a hot or a regular cache, depending on the frequency at which the content is requested. When a hot cache does not contain the content, it requests the content from the forwarder which then forwards the request to a regular cache. When a regular cache does not contain the content, it requests the content from the forwarder which then forwards the request to a content server. There may be more than two layers of cache.

In one aspect of the invention, the caches do not need to be aware of what content other caches contain. Rather, when a cache does not have requested content, it requests the content from the forwarder which then forwards it to another cache or to a content server as appropriate.

In another aspect of the invention, content that is frequently requested is forwarded to a hot cache. If the hot cache does not contain the content, it sends a request to the forwarder which forwards the request to a regular cache which would likely have the content. If the regular cache does not have the content, it sends a request to the forwarder which then sends the request to a content server.

These and various other features as well as advantages, which characterize the present invention, will be apparent from a reading of the following detailed description and a review of the associated drawings.

BRIEF DESCRIPTION OF THE DRAWINGS

FIG. 6 illustrates an exemplary table that may be used to maintain information about content requests;

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

In the following description, first an illustrative operating environment in which the invention may be practiced is disclosed. Then, an exemplary caching system operating in the illustrative operating environment is described. Next, a data structure that may be used to calculate the frequency of requests for content is described. Then a method of using the above to forward requests for content is given. Finally, another configuration of an exemplary caching system is described.

Illustrative Operating Environment

Figure 1:
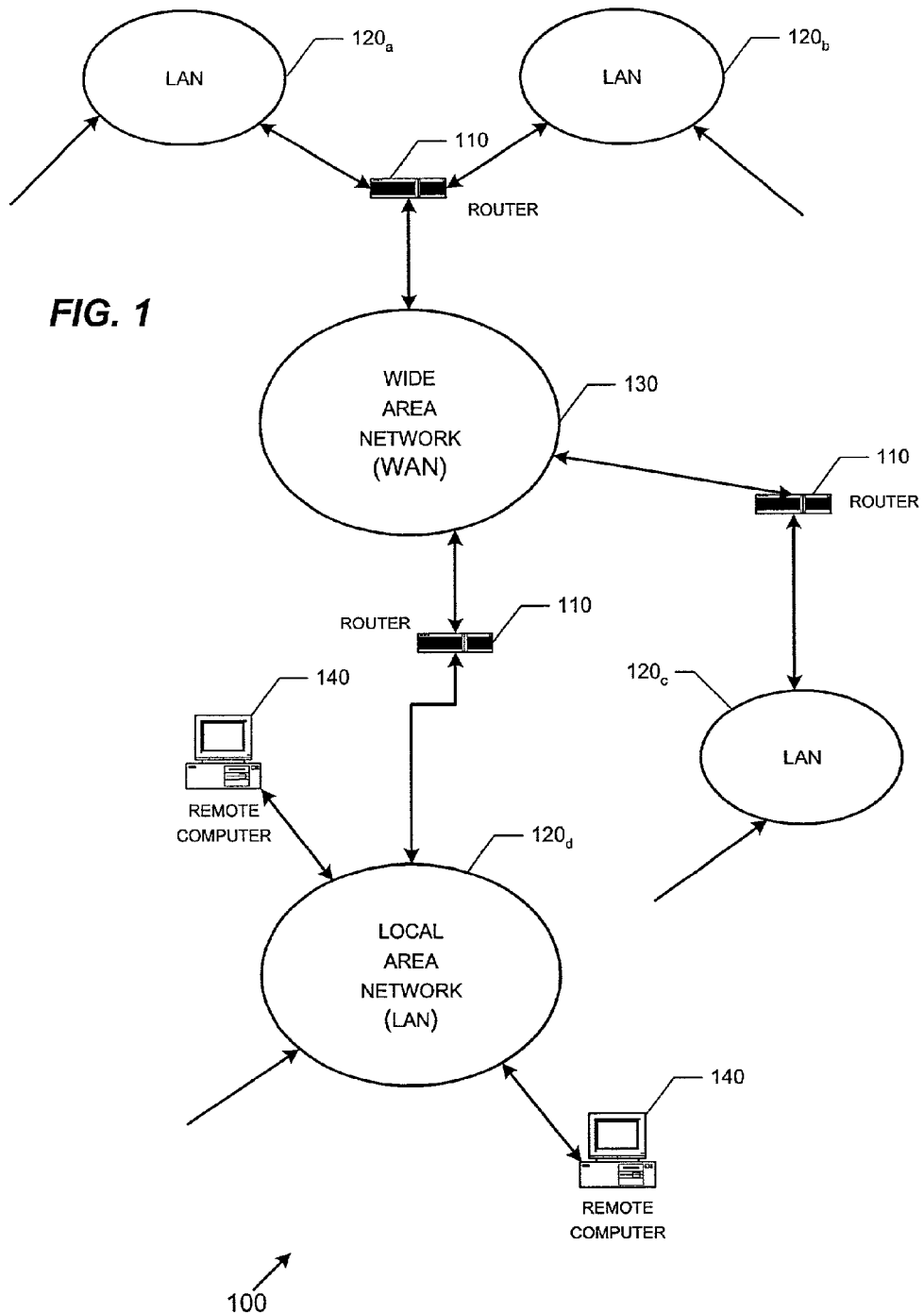
FIGS. 1-3 show components of an exemplary environment in which the invention may be practiced.
Figure 2:
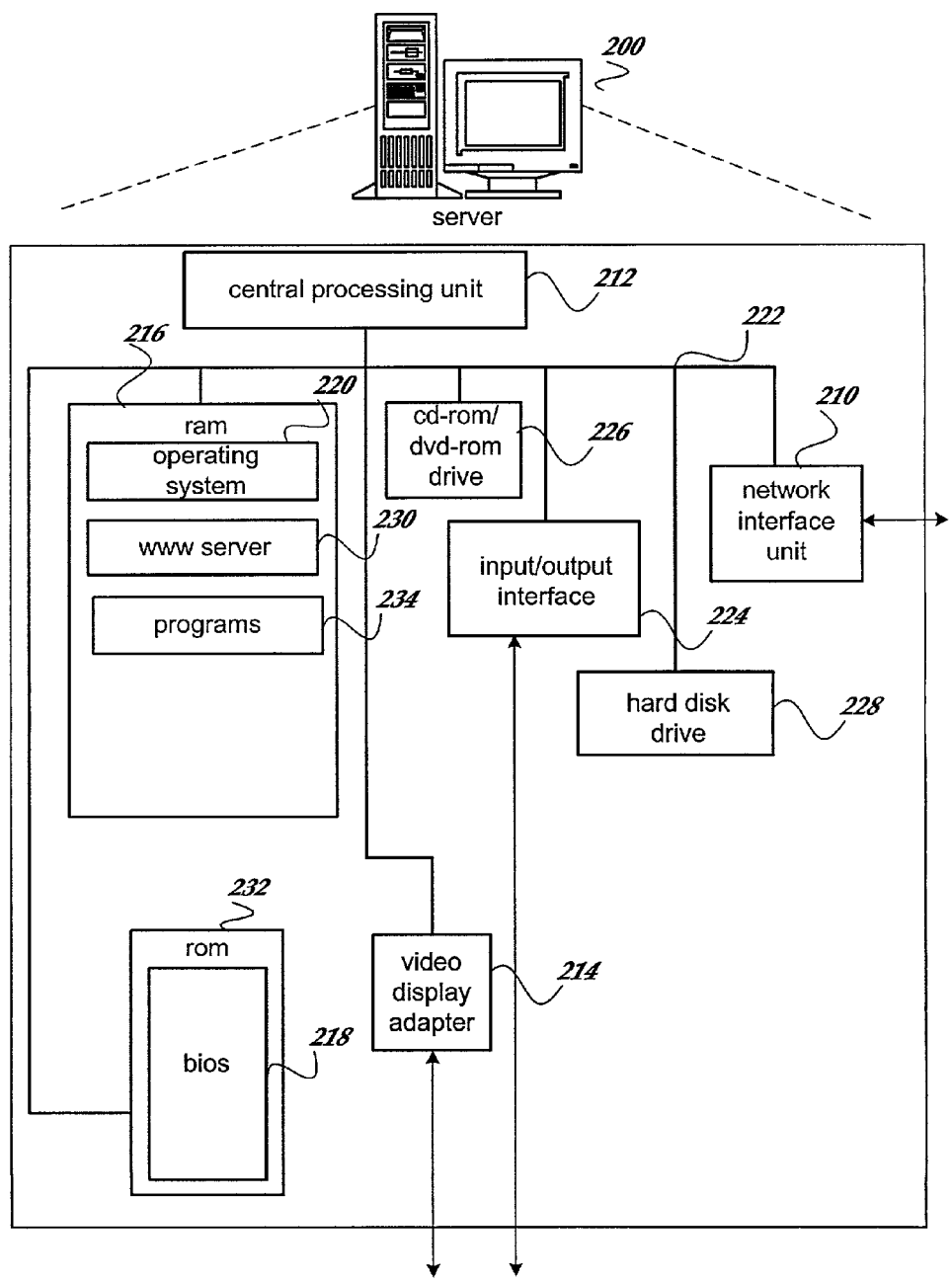
Figure 3:
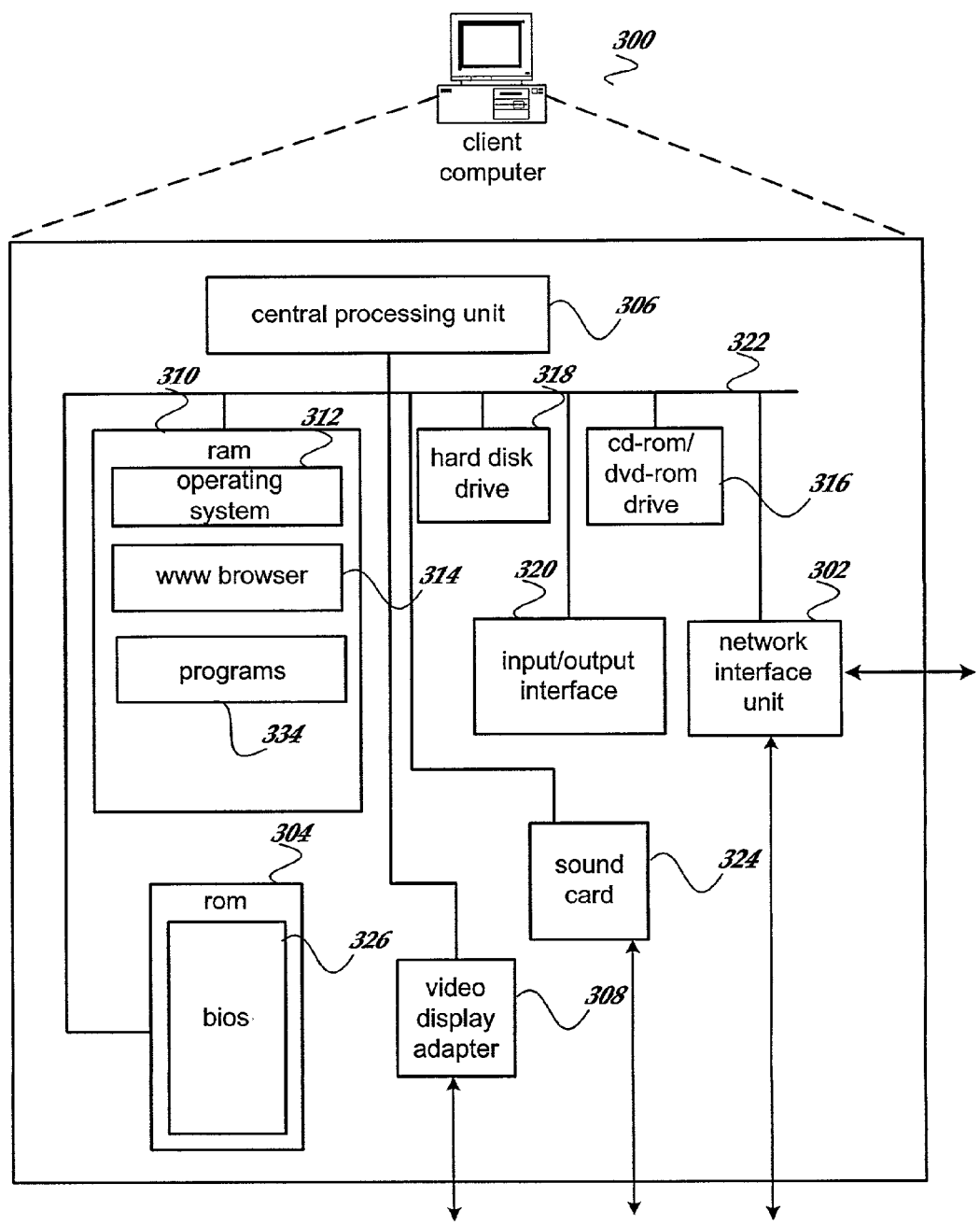

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows a plurality of local area networks ("LANs") 120$_{a-d}$ and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs $120_{a\text{-}d}$ or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server providing a WWW site, as the server described in more detail in conjunction with FIG. 2 may, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network known to those skilled in the art.

Those of ordinary skill in the art will appreciate that the server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Those of ordinary skill in the art will appreciate that network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system as is known to those of ordinary skill in the art, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

FIG. 3 depicts several components of client computer 300. Those of ordinary skill in the art will appreciate that client computer 300 may include many more components than those shown in FIG. 3. However, it is not necessary that those generally-conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point to point protocol ("PPP") connection or a serial line internet protocol ("SLIP") connection as known to those skilled in the art.

Client computer 300 also includes BIOS 326, processing unit 306, video display adapter 308, and memory. The memory generally includes RAM 310, ROM 304 and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on routers 110, on server 200, on client computer 300, or on some combination of the above. For example, programming steps may be contained in programs 334 and/or programs 234. Caching may be performed by one or more servers, such as server 200.

Illustrative Caching System

Figure 4:
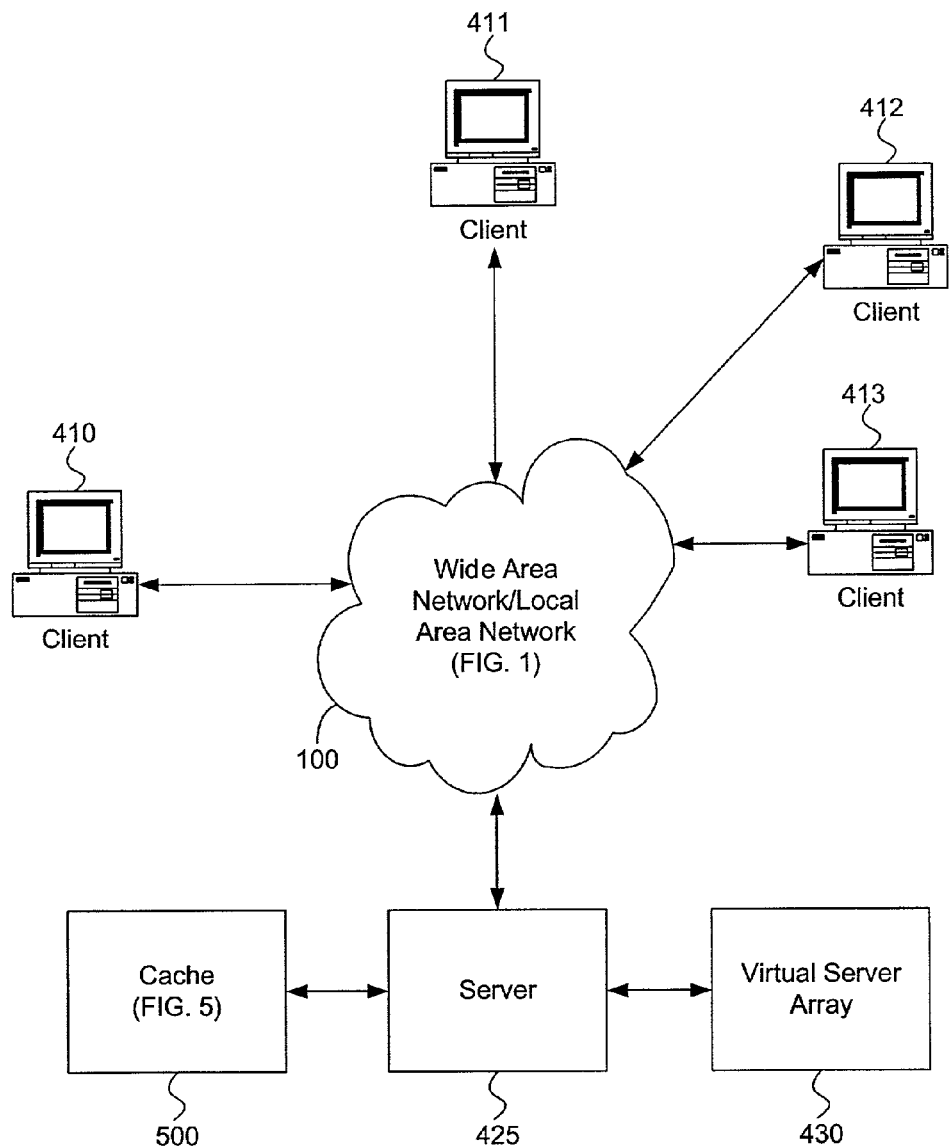
FIG. 4 illustrates an exemplary environment in which the invention operates in which a virtual server array is connected to a server over a communications medium.

FIG. 4 illustrates an exemplary environment in which the invention operates in which a virtual server array is connected to a server over a communications medium, according to one embodiment of the invention. The environment includes clients 410-413, WAN/LAN 100, cache 500, server 425, and virtual server array 430.

Clients 410-413 are any devices capable of connecting with WAN/LAN 100. Such devices may include devices that typically connect using a wired communications medium such as personal computers, multiprocessor systems, microprocessor-based or programmable consumer electronics, network PCs, and the like. Such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. In addition, clients 410-413 may also include devices that are capable of connecting using a wired or wireless communication medium such as PDAs, POCKET PCs, wearable computers, and other devices mentioned above that are equipped to use a wired and/or wireless communications medium. An exemplary client that may connect with WAN/LAN 100 is client computer 300 of FIG. 3.

Server 425 receives, among other things, requests for content. Content includes information that may be found on one or more WWW servers such as Web pages, documents, files, databases, FTP data, or other information. After receiving a request for content, server 425 may forward the request to a cache in cache 500 or to a server in virtual server array 430. Server 425 may determine where to forward the request to using many factors including where the request originates from, what the request is requesting, load on servers in virtual server array 430, and/or other factors. Requests for content may come from a device coupled to WAN/LAN 100, a server in virtual server array 430, a cache in cache 500, or some other requestor.

Figure 5:
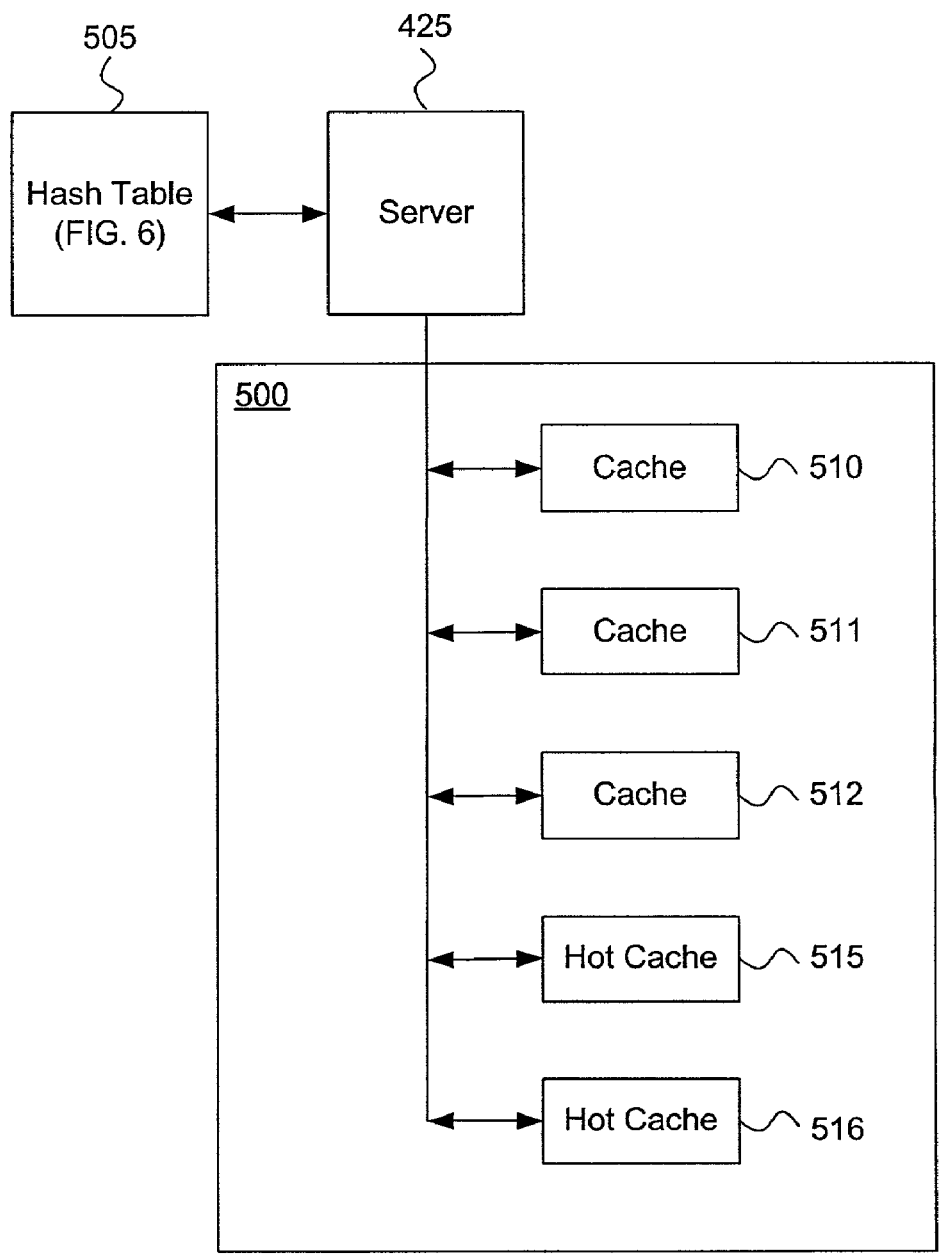
FIG. 5 shows a caching mechanism for speeding access to content.

Cache 500 and its interaction with server 425 are described in more detail in conjunction with FIG. 5. Briefly, cache 500 receives requests for content from server 425. If cache 500 does not have a copy of the content requested, it may request the content from server 425 which may then forward the request to a server in virtual server array 430. Server 425 keeps track of which content is being frequently requested which is stored in cache 500 to speed retrieval of the content.

Virtual server array 430 may include one or more WWW servers, such as server 200 of FIG. 2. These servers may be physically connected to server 425 as shown in FIG. 4 or they may be connected somewhere on WAN/LAN 100 as a remote computer as shown in FIG. 1. Generally, server 425 causes virtual server array 430 to appear as one WWW server. That is, a client, such as client 410, requesting content from server 425 for a Web site will typically be unaware that the request is serviced by a server in virtual server array 430. Server 425 may translate requests from the client and send them to a particular server and then translate responses from the server to make it appear that server 425 itself satisfied the request.

Virtual server array 430 may serve content for more than one vendor. For example, a group of vendors may each run their Web sites using one or more servers in virtual server array 430.

FIG. 5 shows a caching mechanism for speeding access to content, according to one embodiment of the invention. The mechanism includes server 425, hash table 505, and cache 500. Cache 500 includes regular caches 510-512 and hot caches 515-516.

Server 425 may be connected to the caches in cache 500 through one or more communications mediums. Server 425 may include hash table 505 or may be connected to another server or device including hash table 505.

Hash table 505 is described in more detail in conjunction with FIG. 6. Briefly, hash table 505 may be utilized to track requests to determine the frequency with which each content is requested. Server 425 may use hash table 505 to determine to which cache in cache 500 it should forward a request for content.

As described in conjunction with FIG. 4, when server 425 receives a request for content, it determines whether to forward the request to a cache in cache 500 or to a server in virtual server array 430. Server 425 may use several factors in making its determination. One factor server 425 may use is information about the requester, such as where the request comes from. When a request comes from a regular cache, such as regular cache 510, this generally indicates that the cache does not contain information that was previously requested. When a cache does not contain information requested, this is known as a cache miss. When server 425 receives a request for content from a regular cache, it may forward this request to a server in virtual server array 430. When the server returns the content, the requesting cache can then cache the information and send it to a device that requested it. The next time the cache receives a request for the same content, provided it has not eliminated a copy of the content, it may send its copy of the information to the requester. A cache might eliminate a copy of content if the content has not been requested for a period of time or if storage space is needed for other content.

A requestor may be a hot cache. When server 425 receives a request for content from a hot cache, such as hot cache 515, it may forward the request to a cache, such as one of regular caches 510-512. Generally, the regular cache contains the content and can quickly send the hot cache a copy of it. This will be understood by a brief description of how server 425 distributes requests to caches in cache 500. When server 425 receives a request for a content from an outside source, e.g. one of clients 410-413, it looks in hash table 505 to determine if the content has been recently frequently requested (also known as hot).

Content may be hot, for example, if the frequency of requests for it during a time period exceed a certain threshold. Content may also be considered hot, for example, during a period of cool down. For example, if a large number of requests for content come in a short period followed by a brief lull in activity followed by another large number of requests, although "cool" during the lull, the content may not be marked as cool until a selected amount of time has passed. Some content may be specified to be hot regardless of the frequency of requests to it. For example, a vendor may wish to mark some of its Web pages as always hot.

When server 425 determines that the request is not for hot content, it hashes the URL of the request, e.g. http://www.company1.com/support, to determine a regular cache to which the request should be forwarded. A hashing function might take the ASCII (American Standard Code for Information Interchange) value of each letter in the URL, and perform some mathematical operations to obtain a hash value. This hash value could then be divided by the number of available regular caches to obtain a remainder. The remainder could then be used as the cache to which to send the request.

Hashing in this fashion may cause requests for cool content to be hashed to the same value as requests for hot content. Server 425 may use the table shown in FIG. 6 in addition to the hashing function to send a request for hot content to a hot cache and a request for cool content to a cool cache as described in more detail in conjunction with FIG. 6.

Figure 10:
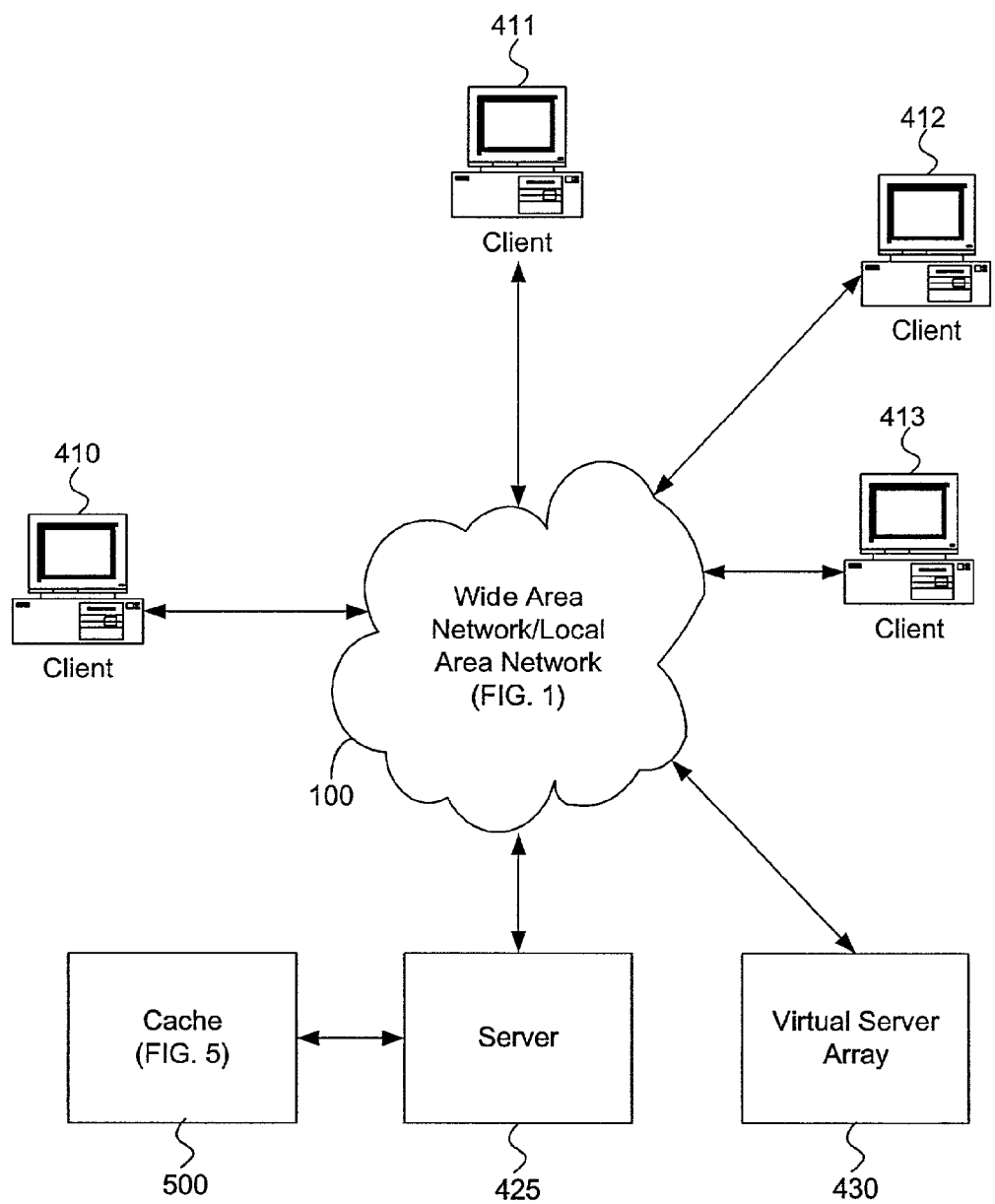
FIG. 10 illustrates an exemplary environment in which the invention operates in which a virtual server array is connected to a server over a network in accordance with the invention.

After server 425 has obtained a hash value corresponding to a regular cache, when the content is cool, it sends the request to the regular cache. If server 425 receives several requests for the same URL in a short period of time, it may determine that the content associated with the URL should be marked as hot. While content is marked hot, server 425 generally sends requests for the content to one of hot caches 515-516, such as hot cache 515. Usually, the first time hot cache 515 receives a request for the content, it does not have the content, but the regular cache that was receiving requests for the content just prior to the request being sent to hot cache 515 usually does. Therefore, when a hot cache, such as hot cache 515, requests the content because of a cache miss, server 425 may determine that a regular cache should contain the content and forward the request to the regular cache. This eliminates sending a request to a server in virtual server array 430 which avoids potential latency, especially when the server is not connected directly to server 425 (as seen in FIG. 10).

Another factor server 425 may use to forward the request to a cache is information about what is requested. For example, a request may include information that indicates that the request is for dynamically generated content. For example, the request may be for stock prices. Stock prices often change. Extensions within the request may indicate that a program or script will run to generate the content. For example, a request may include a reference including an extension of .asp, .cfm, .cgi, .jsp, .js, .php, etc. These extensions are commonly used to cause a program or script to run to generate dynamic content. Server 425 may determine that such requests should not be cached and send them to a server in virtual server array 430.

It will be appreciated that server 425 may take into account other factors when determining whether to forward the request to a cache or a server without departing from the spirit or scope of this invention.

It will also be appreciated that there may be more than two levels of cache. That is, there may be a hierarchy of caches. Which cache content is forwarded to may depend on the frequency with which the content is requested or other factors as described above. For example, in a three level cache system, highly requested content may be forwarded to a highest level cache, regularly requested content may be forwarded to a medium level cache, and seldom requested content may be forwarded to a low level cache. When a cache at any level does not contain the content, it sends a request to the forwarder which may then forward the request to a lower level cache or content server as appropriate.

Regular caches 500-512 and hot caches 515-516 are connected to server 425. They may be implemented as a special purpose electronic device or using a server such as server 200. More than one cache may be on one electronic device or server. For example, regular cache 500 and hot cache 515 may be on one server while regular caches 510-512 and hot cache 516 maybe on another server. A cache may be spread over more than one electronic device or server. For example, two or more servers may act logically as one or more caches.

Exemplary Data Structure

FIG. 6 illustrates an exemplary table that may be used to maintain information about content requests, according to one embodiment of the invention. The table includes a content field, a hits field, and a hot field. The content field shown in the figure gives a URL in ASCII for the content requested. In another embodiment of the invention, the content field contains a numerical value corresponding to a hash value of the URL. The content field may be indexed to allow faster searching.

Although the table shows only one reference to content per row, the content field may include multiple references to different content per row or a link to a record that contains multiple references to different content. The set of different content referenced by a row is known as a content set. A request for any of the content in a content set may be used to increment the hits field associated with the content set and in hot/cold calculations. A content set may be considered hot even if some of the content in the content set is not requested. For example, even though some of the content in a content set may not be requested, other content in the content set may be frequently requested. When performing hot/cold calculations, the hits (requests) for all the content in the content set may be summed. This allows a vendor to group content together.

Throughout this document references are made to content and content set. Where it makes sense, a reference to content should be construed to mean additionally or alternatively content in a content set or a content set associated with the content. For example, a reference to a request for content should also be construed to mean a request for content in a content set. A reference to tracking which content is frequently requested should also be construed as a reference to tracking the frequency of requests for content included in a content set associated with the content.

The hits field corresponds to the frequency with which the content is requested. It may include the actual number of times the content was requested. It may be reset with each time period. It may be a weighted rate of hits, with more recent hits being weighted more heavily.

The hot field gives an indication of how hot the content is. It may be a binary, yes/no, type of field in which a zero indicates cool and a one indicates hot. It may take on more than two values. For example, to implement a "cool" down period, when the frequency of requests for a content surpasses a hot threshold, the hot field may be set to 3. After a period passes, if the frequency of requests during the period are below a cool threshold, the hot field may be decremented. While the hot field stays above zero, requests for the content are forwarded to a hot cache, even if in a previous time period the frequency of requests for the content were below the cool threshold.

The table shown in FIG. 6 may be used with the hashing function previously discussed to send requests for hot content to a hot cache while sending requests for cool content to a regular cache. Suppose that the hashing function hashed the two URLs, www.company1.com/news and www.company2.com/support to the same value. By looking in the table, server 425 may determine that requests for www.company1.com/news should be directed to a hot cache whereas requests for www.company2.com/support should be directed to a regular cache indicated by the hash value. After server 425 determines that a request should be directed to a hot cache, it determines to which hot cache the request should be forwarded. Server 425 may be configured to use one of several approaches including round-robin, least-loaded, least connections, priority of requestor and speed of cache, fastest response time, or any other load balancing algorithm.

Illustrative Method for Forwarding Requests for Content

Figure 7:
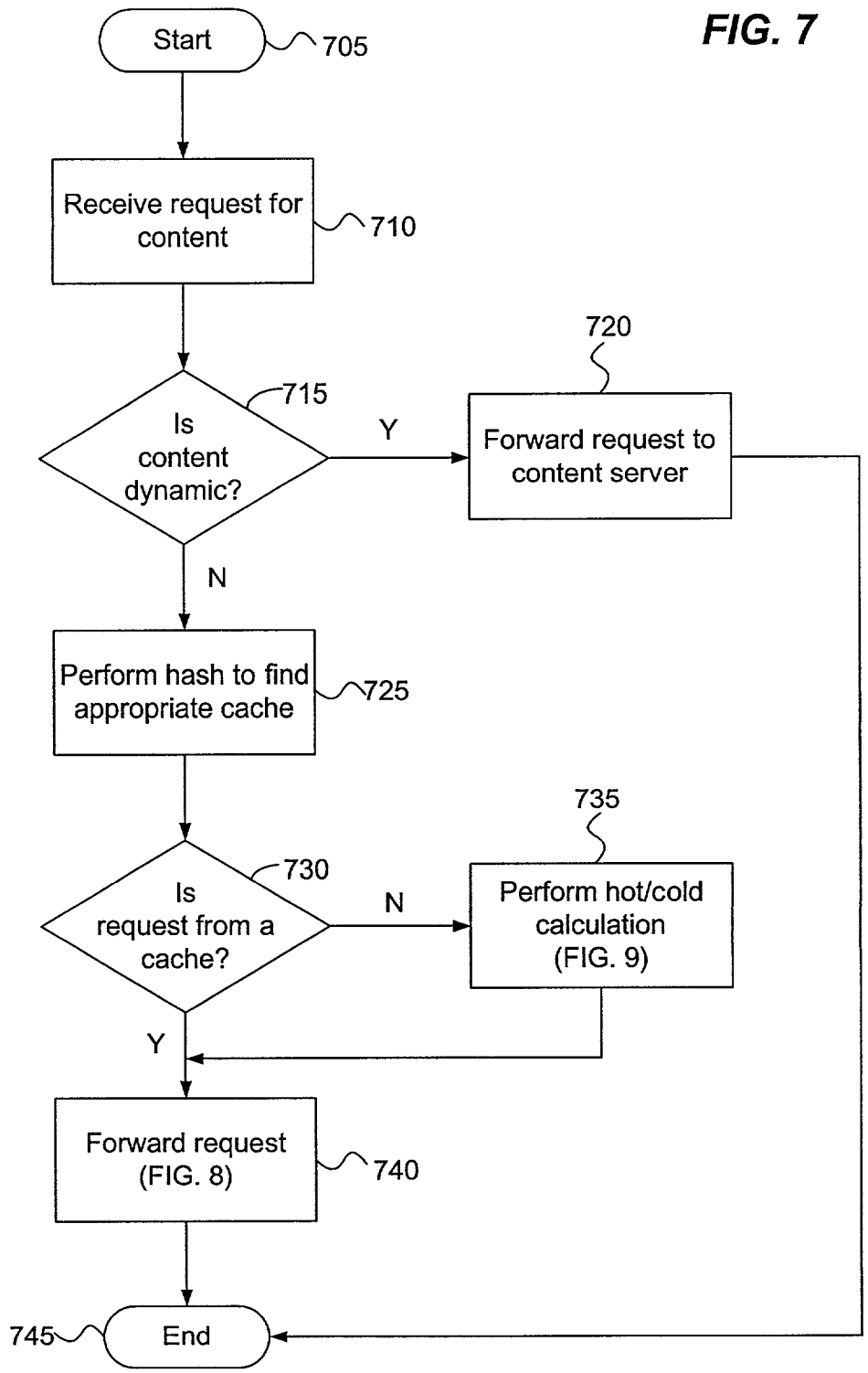
FIG. 7 shows a flow chart for receiving and forwarding requests for content.

FIG. 7 shows a flow chart for receiving and forwarding requests for content, according to one embodiment of the invention. The process begins at block 705 after a requestor, such as one of clients 410-413 of FIG. 4, requests content.

At block 710, the request for content is received. For example, referring to FIG. 4, server 425 receives a request for a Web page that is located on one of the servers in virtual server array 430.

At block 715, a determination is made as to whether the content is dynamic. For example, the request may be for content that ends in .asp, .cfm, .cgi.jsp, .js, .php, or other content that server 425 knows is dynamic. If the request is for dynamic content processing branches to block 720; otherwise, processing branches to block 725.

At block 720, the request is forwarded to a content server without being forwarded to a cache. This avoids caching information that may change for each requestor. For example, referring to FIG. 4, server 425 forwards the request to a server in virtual server array 430.

At block 725, the request is hashed to find a hash value corresponding to content. This hash value may be used later to update the frequency with which a content is requested when the request does not come from a cache. For example, referring to FIG. 4, server 425 takes the request for http://www.company1.com/support and hashes it into an index into the table shown in FIG. 6.

At block 730, a determination is made as to whether the request comes from a cache. When it does, processing branches to block 740; otherwise, processing branches to block 735. This may occur to avoid the double counting of requests. For example, if a site requested content, usually, the hits in the table of FIG. 6 are increased. If, however, a cache did not contain the content, it would request the content from the server. If the server did not check to see if the request comes from a cache, it might increase the hit count again for that content. For example, referring to FIG. 4, server 425 determines that the request is coming from one of clients 410-413.

Figure 9:
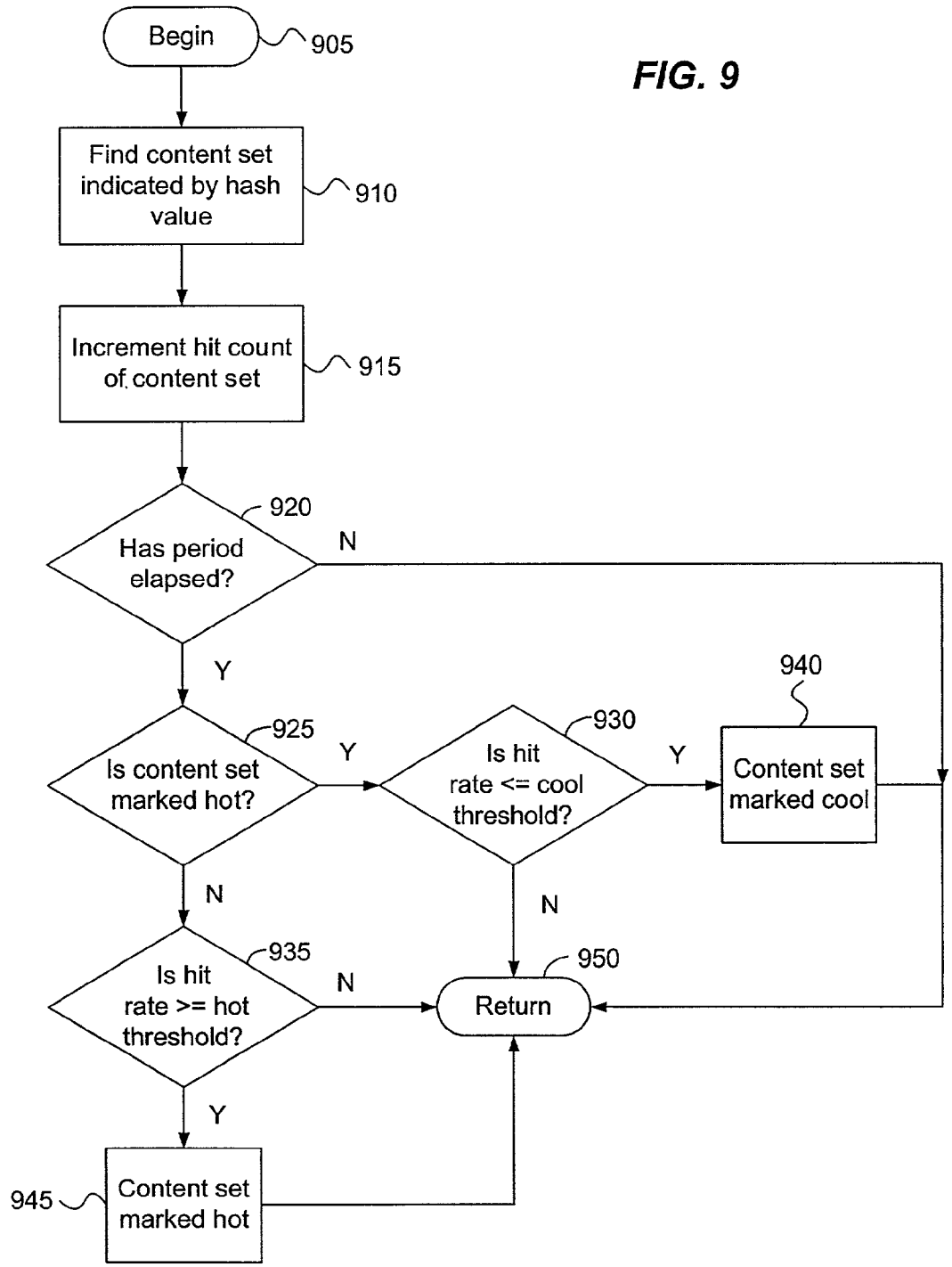
FIG. 9 shows a flow chart for performing a hot/cold calculation.

At block 735, a hot/cold calculation occurs as described in more detail in conjunction with FIG. 9. Briefly, a rate of requests is calculated and the content requested may be marked hot or cold depending on the rate. For example, referring to FIG. 4, server 425 updates the table shown in FIG. 6 to indicate whether the content requested is hot or cold. In another embodiment of the invention, a process runs periodically to update the hot/cold status of each content in the table of FIG. 6. In this embodiment, the hot/cold calculation that occurs in response to a request in block 735 may be skipped as it is done by the periodic process.

Figure 8:
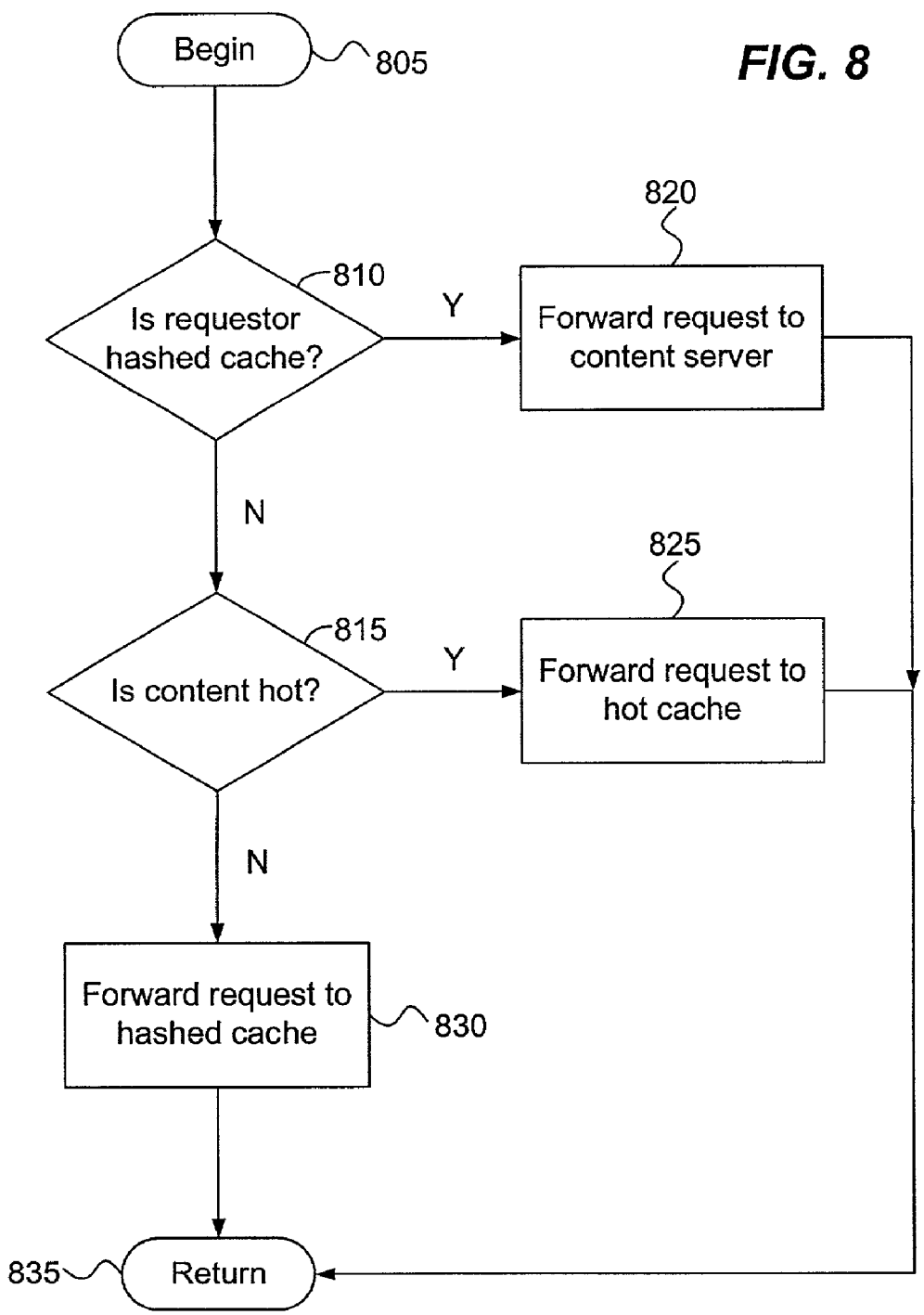
FIG. 8 illustrates a flow chart for determining where to forward a request for non-dynamic content.

At block 740, the request is forwarded appropriately as described in more detail in conjunction with FIG. 8. Briefly, if the request is for hot content, it is forwarded to a hot cache. If the request is for cold content, it is forwarded to a regular cache. If the request is from a regular cache that the request would have been hashed to if cold, the request is forwarded to a content server.

At block 745, the process ends. At this point a request for content has been received. When the request is determined to request dynamic content, it has been forwarded to a content server. Otherwise, a hashing function has been utilized to find an appropriate cache to which the request might be forwarded. If the request is not from a cache, statistics are updated and a hot/cold calculation may be performed. If the request was from a cache, it has been forwarded to another cache or to a content server.

FIG. 8 illustrates a flow chart for determining where to forward a request for non-dynamic (also called static) content, according to one embodiment of the invention. The process begins at block 805 after a request from a cache has been received.

At block 810, a determination is made as to whether the requestor is the cache that a request for the content would have been hashed to if cold. A cache may incur a cache miss if it does not contain content that has been requested from it. To obtain the content, the cache requests it from a server that forwarded the request to the cache. The server recognizes that a request for content coming from a cache to which the server previously requested the content indicates that the cache does not have the content. If the cache is the cache that a request for the content would have hashed to, processing branches to block 820; otherwise, processing branches to block 815. Referring to FIG. 5, server 425 receives a request for content associated with http://www.company1.com/support and forwards the request to regular cache 510. Regular cache 510 does not contain the content, so it requests it from server 425. Server 425 recognizes that the cache to which it hashed and forwarded the request does not contain the content, and prepares to forward the request from the cache to a server in virtual server array 430 of FIG. 4.

At block 820, the request is forwarded to a content server. For example, referring to FIG. 5, server 425 forwards the request to a server in virtual server array 430.

At block 815, a determination is made as to whether the content is hot. If it is, processing branches to block 825; otherwise processing branches to block 830. For example, referring to FIGS. 5 and 6, server 425 determines that the request for the content associated with http://www.company1.com/support is cold.

At block 825, the request is forwarded to a hot cache. For example, referring to FIGS. 5 and 6, server 425 uses a round-robin approach to forward the request for http://www.company2.com/home to hot cache 515.

At block 830, the request is forwarded to the cache to which it was hashed. For example, referring to FIG. 5, server 425 forwards the requests for http://www.company1.com/support to regular cache 510.

At block 835, the process returns to the calling process. At this point, the request has been forwarded to a content server, a hot cache, or a regular cache.

FIG. 9 shows a flow chart for performing a hot/cold calculation, according to one embodiment of the invention. The process begins at block 905 after a request from a requestor other than a cache has been received.

At block 910, the content set indicated by the hash value is located. For example, referring to FIG. 6, a content set associated with the content requested is located. For purposes of this discussion, assume that each content set shown in the content field of FIG. 6 includes content associated with children URLs. For example, the content set www.company1.com/home would include www.company1.com/home in addition to www.company1.com/home/FAQ, www.company1.com/home/services, etc. Then, the content set located for a request for www.company1.com/home/services would be www.company1.com/home.

At block 915, the hit count of the content set is incremented. For example, referring to FIG. 6, the hits field for www.company1.com/home is incremented.

At block 920, a determination is made as to whether a selected time period has elapsed since the last hot/cold calculation. When the period has not elapsed, the hot/cold calculation is not performed and processing branches to block 955. Otherwise, processing branches to block 925 to determine whether the content set needs to be marked hot or cold.

At block 925, a determination is made as to whether the content set is marked hot. For example, referring to FIG. 6, the content set associated with www.company1.com/home is currently marked as cold. When the content set is marked hot, processing branches to block 930; otherwise, processing branches to block 935.

At block 930, a determination is made as to whether the hit rate of the content set is less than or equal to a cool threshold. If it is, processing branches to block 940; otherwise, processing branches to block 955. The requests for content in a content set may fall below a cool threshold indicating that requests for the content should no longer be serviced by hot caches. This block determines whether the rate of requests has fallen below the threshold. Note, that a different hot and cool threshold may be set for each content set or a hot and cool threshold may be set globally to apply to all content sets.

At block 935, a determination is made as to whether the hit rate of the content is greater than or equal to a hot threshold. When it is, processing branches to block 945; otherwise, processing branches to block 950. It is at this block that a content set that is not currently marked as hot is checked to determine whether it should be marked hot.

At block 940, the content set is marked as cold. For example, referring to FIG. 6, the hot field for the content set is modified to indicate cold status. For example, the hit frequency for www.company1.com/news may fall from 15 to 5, dropping below the cold threshold of 6 per period, and the hot field is changed from 1 to 0 to indicate that the content is cold.

At block 945, the content set is marked as hot. For example, referring to FIG. 6, the hot field for the content set is modified to indicate hot status. For example, the hit frequency for www.company1.com/products may increase by 3 to 10, exceed the hot threshold of 9 per period, and the hot field is changed from 0 to 1 to indicate that the content is hot.

At block 950, the process returns to the calling process. At this point, a content set has been located and the hit count of the content set increased. If a selected time period has elapsed, the content set is checked to determine whether it needs to be marked hot or cold depending on the number of requests for the past period and a hot and cold threshold. Using the now-current hot field, the calling process may now forward the request to a hot or regular cache appropriately.

Another Exemplary Configuration of a Caching System

FIG. 10 illustrates an exemplary environment in which the invention operates in which a virtual server array is connected to a server over a network, according to one embodiment of the invention. A difference between the environment shown in FIG. 4 and the environment shown in FIG. 10 is that server 425 reaches virtual server array 430 over WAN/LAN 100 rather than being more directly connected with it. Virtual server array 430 may include many physical servers which may be connected to WAN/LAN 100 at various places. That is, even the servers within virtual server array 430 do not need to be physically located together.

In light of this disclosure, it will be recognized that many variations of the above process may be implemented without departing from the spirit or scope of this invention.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of forwarding requests for content from a client over a network, comprising:
   (a) receiving a request for content over the network and based on a determination of content generation information included within the request, determining if the requested content is dynamic or static;
   (b) if the requested content is determined to be dynamic, forwarding the request over the network to a content server that enables access to the dynamic content; and
   (c) if the requested content is determined to be static, forwarding the request over the network to a plurality of caches that enable access to the static content, wherein the plurality of caches include at least one hot cache, wherein the plurality of caches is organized in a hierarchy and wherein a higher level cache in the hierarchy is associated with a higher frequency of requests for static content than a lower frequency of requests for static content associated with a lower level cache, and wherein forwarding the request over the network to the plurality of caches that enable access to the static content further comprises recursively forwarding requests, generated from different caches in the hierarchy based on the received request and receipt of one of the recursively forwarded requests at each of the different caches in the hierarchy, through the hierarchy until a frequency of the request for static content exceeds a threshold associated with the hot cache and particular to a content set that includes the requested content.

2. The method of claim 1, wherein the hot cache caches static content when a frequency of requests for the static content exceeds the threshold.

3. The method of claim 1, further comprising when the static content is unavailable in the hot cache, forwarding the request to another cache in the plurality of caches.

4. The method of claim 1, further comprising when the static content is unavailable from any one of the plurality of caches, forwarding the request to the content server that enables access to the static content.

5. The method of claim 1, further comprising examining the request for an extension indicating that a process is performed in response to the request, wherein the process includes an application program or a script.

6. The method of claim 1, wherein the content includes information associated with a plurality of resource identifiers.

7. The method of claim 6, wherein the resource identifiers are uniform resource locators (URLs).

8. A method for forwarding a request for content from a client over a network, comprising:
   (a) determining a frequency of requests summed from requests for all content of a plurality of different static content in a content set, wherein the content set includes the requested content, and wherein a determination of content generation information included within the request determines a static type of the requested content; and
   (b) if the frequency of requests for the plurality of different static content in the content set exceeds a threshold that is particular to the content set, forwarding the request for the static content over the network to a first cache that employs a hot list for access to static content that is separately cached,
   and wherein the static content is obtained when unavailable in the first cache by actions, including:
      (i) generating a second request for the static content; and
      (ii) forwarding the second request over the network to a second cache determined by hashing an identifier associated with the static content if the frequency of requests for the plurality of different static content in the content set is below the threshold.

9. The method of claim 8, wherein when the frequency of requests for the plurality of different static content in the content set is below the threshold, hashing the identifier associated with the content to obtain a value and forwarding the request over the network to a cache associated with the value.

10. The method of claim 8, wherein when the static content is unavailable from the second cache, a third request for the static content is forwarded over the network to a content server.

11. The method of claim 10, wherein the content server forwards the third request over the network to a third cache.

12. A system for forwarding a request for content from a client over a network, comprising:
   (a) a forwarder that receives each request for content in the system and forwards each request over the network to at least one of a content server and one of a plurality of caches including at least a hot cache and a regular cache, wherein the forwarding of each request is based on a determination of content generation information included within each request if the requested content is dynamic or static and a determination of a frequency of each request for a static type of content and a determination if a request for the content received at the forwarder is coming from a cache in the plurality of caches to which the forwarder previously forwarded a prior request over the network for the content;

(b) the content server is coupled to the forwarder, wherein the content server sends content over the network to the client in response to each request that is forwarded to the content server; and (c) the plurality of caches coupled to the forwarder, wherein the hot cache is based at least in part on the request for static content with a higher frequency greater than a lower frequency associated with a lower level cache and that exceeds a threshold that is particular to a content set that includes the requested content, and wherein one cache sends static content over the network to the client in response to each request for static content that is forwarded over the network to the plurality of caches.

13. The system of claim 12, wherein the cache includes an additional cache, and wherein the hot cache, the regular cache, and the additional cache are arranged in a hierarchical order for receiving each forwarded request for content from the forwarder, and wherein each cache that receives the forwarded request for content that is unavailable, generates an additional request for the content and sends the additional request to the forwarder.

14. The system of claim 12, wherein the forwarder is coupled to the content server over a wide area network/local area network.

15. The system of claim 12, wherein the forwarder is coupled to the content server over a communications medium.

16. The system of claim 12, wherein the request is associated with information, and wherein the information includes a location at which the request is generated, the frequency of requests for the content, or the nature of the content requested.

17. The system of claim 16, wherein the forwarder is further structured to forward requests over the network to the content server when the information indicates that the request is generated by the regular cache.

18. The system of claim 16, wherein the forwarder is further structured to forward requests over the network to the hot cache when the information indicates that the rate of requests exceeds a threshold.

19. The system of claim 16, wherein the forwarder is further structured to forward requests over the network to the regular cache when the information indicates that the request is generated by the hot cache.

20. The system of claim 12, wherein the hot cache and the regular cache are located on one device.

21. The system of claim 12, wherein the server uses a hash table to calculate the number of requests for the content.

22. The system of claim 12, wherein the content includes information associated with a plurality of resource identifiers.

23. The system of claim 22, wherein the resource identifiers are uniform resource locators (URLs).

24. A method of forwarding requests for content from a client over a network, comprising:

(a) means for receiving a request for content over the network from a client and determining if the requested content is dynamic or static based on content generation information included within the request;

(b) if the type of the requested content is determined to be dynamic, means for forwarding the request over the network to a content server that enables access to the dynamic content; and (c) if the type of the requested content is determined to be static, means for forwarding the request over the network to a plurality of caches that enable access to the static content, wherein the plurality of caches is organized in a hierarchy of caches, wherein the plurality of caches includes at least one hot cache that further includes content based at least in part on a higher frequency of request for static content that is greater than a lower frequency associated with a lower level cache in the hierarchy and that exceeds a threshold that is particular to a content set that includes the requested content, and wherein forwarding the received request over the network to the plurality of caches comprises forwarding a request, generated by the at least one hot cache, for content associated with a higher frequency of request to a lower level cache in the hierarchy.

25. A computer readable storage medium tangibly embodying machine executable instructions stored thereon, configured to be executed by at least one processor, the medium comprising:

(a) a forwarder that receives each request for content and forwards each request over the network to at least one of a content server and a plurality of caches including at least a hot cache, wherein forwarding each request is based on at least one of a determination if the content requested is dynamic or static by the content generation information included within the request and a determination of the frequency of requests for a static type of content and a determination if a request for content received at the forwarder is coming from a cache in the plurality of caches to which the forwarder previously forwarded a prior request over the network for the content;

(b) a transceiver that couples the content server to the forwarder, wherein, if a request is determined to be for a dynamic content type, the forwarder forwards the request over the network to the content server, whereby the content server sends content to the client in response to each request that is forwarded to the content server; and (c) another transceiver that couples the plurality of caches to the forwarder, wherein the hot cache that is based at least in part on the request with a higher frequency greater than a lower frequency associated with a lower level cache and that exceeds a threshold that is particular to a content set that includes the requested content, and wherein one cache sends content over the network to the client in response to each request that is forwarded over the network to the plurality of caches based on a determination of the request.

26. A method of forwarding requests for content from a client over a network, comprising:

receiving a request for content over the network and determining if the request is for a dynamic or static type of content;

selectively communicating over the network with at least one of a plurality of caches for a static type of content based on a negative determination of the content generation information included within the request, wherein the plurality of caches is organized in a hierarchy of caches that includes at least a hot cache, and wherein selectively communicating comprises sending a first request to one of the plurality of caches and subsequently receiving a second request for the same content from the one of the plurality of caches; and providing a response over the network to the request for static content based on the negative determination of the request, wherein the hot cache is based at least in part on the request for static content with a higher frequency greater than a lower frequency associated with a lower level cache in the plurality of caches in the hierarchy and that exceeds a threshold that is particular to a content set that includes the requested content.

27. The method of claim 26, further comprising selectively communicating with at least one content server based on an affirmative determination of the request.

* * * * *

UNITED STATES PATENT AND TRADEMARK OFFICE
Certificate

Patent No. 7,769,823 B2

Patented: August 3, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Patrick Duncan Jenny, Seattle, WA (US); Carlton G. Amdahl, Fremont, CA (US); Scott P. Tennican, Seattle, WA (US); and Ronald Sanders, Spokane, WA (US).

Signed and Sealed this Thirtieth Day of October 2012.

JOSEPH E. AVELLINO
*Supervisory Patent Examiner*
Art Unit 2454
Technology Center 2400